United States Patent
Runge

[15] 3,656,068
[45] Apr. 11, 1972

[54] RESONANT SELF-PULSING ACOUSTO-OPTICAL MODULATOR

[72] Inventor: Peter Klaus Runge, Fair Haven, N.J.
[73] Assignee: Bell Telephone Laboratories, Incorporated, Murray Hill, Berkeley Heights, N.J.
[22] Filed: Dec. 3, 1970
[21] Appl. No.: 94,647

[52] U.S. Cl. ........................................ 331/94.5, 350/161
[51] Int. Cl. ........................................................ G02f 1/28
[58] Field of Search ............................... 331/94.5; 350/161

[56] References Cited

UNITED STATES PATENTS

| | | | |
|---|---|---|---|
| 2,513,520 | 7/1950 | Rosenthal | 178/5.4 |
| 3,297,876 | 1/1967 | De Maria | 350/161 X |
| 3,372,973 | 3/1968 | Flichbaugh | 350/161 |
| 3,397,936 | 8/1968 | Frayne et al. | 350/161 |
| 3,412,251 | 11/1968 | Hargrove | 331/94.5 |
| 3,424,906 | 1/1969 | Korpel | 350/161 X |
| 3,454,325 | 1/1969 | Ohm | 350/160 |
| 3,502,879 | 3/1970 | Vallese | 350/161 X |
| 3,529,263 | 9/1970 | Simmons | 331/94.5 |
| 3,572,897 | 3/1971 | Bousky | 350/160 |

OTHER PUBLICATIONS

Gordon: "A Review of Acoustooptical Deflection and Modulation Devices," Proc. IEEE, vol. 54, pp 1391– 1401, Oct. 1966

*Primary Examiner*—Ronald L. Wibert
*Assistant Examiner*—Edward S. Bauer
*Attorney*—R. J. Guenther and E. W. Adams, Jr.

[57] ABSTRACT

A self-pulsing acousto-optical modulator system produces acoustical pulses in the modulator which are capable of deflecting an optical beam. Multiple resonances in the modulator are phase locked by means of an electrical feedback path, thereby producing a continuous series of traveling pulses in the modulator. When this modulator system is placed in a laser cavity it causes the laser beam to be repetitively switched out of the cavity, producing laser pulses.

12 Claims, 11 Drawing Figures

PATENTED APR 11 1972                3,656,068

INVENTOR
P. K. RUNGE
BY
David P. Kelley
ATTORNEY 3,656,068

RESONANT SELF-PULSING ACOUSTO-OPTICAL MODULATOR

BACKGROUND OF THE INVENTION

This invention relates to modulators for controlling the output of lasers and, more particularly, to self-resonant acousto-optic modulators for modulating, mode locking, and switching of laser beams.

An acousto-optic modulator can be made by attaching a transducer to a crystalline material, such as quartz. Acoustic waves are then set up in the crystal by applying an electrical signal to the transducer. This type of modulator affects light waves which are passed through it because the acoustic waves generated in the crystal cause localized changes in the index of refraction. These changes of refractive index are associated with the acoustic wave's strain on the molecules of the crystal. When a constant frequency electrical signal is applied to the transducer, acoustic waves propagate across the crystal, forming a diffraction grating corresponding to the pattern of the acoustic waves. The grating constant, i.e., the number of acoustic wavelengths per unit length, is proportional to the frequency of the electrical driving source. When a light beam is passed through the crystal this diffraction effect causes part of the light beam to bend. Therefore, a change in the acoustic frequency will cause the light beam to sweep back and forth.

Modulation or switching of a laser beam can be accomplished with one of these modulators if it is placed in the laser's cavity, near one of its mirrors. Switching or modulation of this type relies on the fact that laser action requires that most of the light be contained in the laser cavity. Therefore, when light is removed from the cavity, the laser action stops and the light output diminishes. This effect can be achieved by setting up an acoustic wave in the modulator which deflects the light so that it strikes the cavity mirror at an angle which will not reflect it back into the laser medium. This will cause the laser action to stop and is a form of amplitude modulation. This technique can also be used to generate a series of light pulses if the acoustic wave length is four or more times that of the optical beam width. In this situation a modulator with transducers mounted on both ends is used. An oscillator is connected to one of the transducers and is used to generate a single frequency traveling wave in the modulator. The other transducer picks up the traveling wave and feeds it back to the oscillator as positive feedback. This traveling wave causes the laser beam to scan the mirror. This happens because the traveling wave causes a variable index of refraction to pass through the light beam, causing it to bend at a new angle for each refractive index change. During the time the scanning angle is not close to zero, the light beam reflected from the mirror is directed away from the laser medium and the energy loss will prevent laser action from taking place. However, when the scanning angle is zero or nearly zero, the light from the mirror is able to pass through the modulator to the laser medium, causing laser action and a corresponding optical pulse.

Another technique for generating light pulses involves the application of a frequency burst to the transducer of a modulator. This creates an acoustic pulse in the modulator which, on intersecting the light beam, will bend or switch it completely out of the cavity. These deflected light pulses are larger than the c.w. output of the laser because they are not required to pass through and be attenuated by the cavity mirrors.

Gas lasers generally oscillate in several modes, causing the laser's output to have a randomly fluctuating amplitude. If a modulator which has been placed in the cavity is switch ON and OFF at the correct frequency, it tends to cause the modes of the laser to "lock." When this happens, the modes of the laser oscillate with a well-defined phase and amplitude. This mode locking changes the laser's output into a series of very short light pulses. There are several methods disclosed in the prior art for generating the correct frequency automatically. In general, these methods involve placing a photodetector behind one of the cavity mirrors. This photodetector converts the light which passes through the mirror into an R.F. electrical signal. This signal is then amplified and used to drive the modulator. The modulator then perturbs the laser output, thereby completing a feedback loop. If the phase of the feedback signal is correct, the signal will be further amplified at a frequency that is regenerative. The process will, therefore, build in a manner typical of oscillators.

The prior art systems involve either driving the modulator with a single frequency oscillator or pulsing it. The feedback arrangements employed in these systems are used to control the frequency of the driving oscillator or to feed back the frequency modes to the laser to the modulator, thereby mode locking it. None of these modulator driving frequencies has any relation to the crystal's construction. However, if they were related to the crystal, i.e., at one of the crystal resonances, there could be a savings in drive power. Also, if the crystal is part of the feedback path of a regenerative system, the acoustic waves will be generated at the crystal resonance automatically. It is therefore an object of this invention to provide a system which makes use of the crystal resonances in a regenerative system to perform the operations of amplitude modulation, switching, and mode locking of laser outputs.

SUMMARY OF THE INVENTION

The present invention is directed to reducing the drive power required in an acousto-optic modulator. This is accomplished by taking advantage of the natural resonances of the modulator. Also, the invention is arranged so that it is self-pulsing, thereby eliminating the need for a driving oscillator.

In an illustrative embodiment of the invention an acousto-optic modulator, made by forming two opposite ends of a block of a suitable material, such as quartz, into spherical surfaces, is used. However, a modulator with relatively flat or other surfaces can be used, depending on the acoustic frequency and the losses that can be tolerated. The radii of curvature for the spheres are calculated from the well-known formulae for open side optical resonators. Each of these spherical ends has a transducer attached to it. The first transducer of this acousto-optic modulator is connected to an expandor, which is a circuit that provides more gain (less attenuation) for a large amplitude signal than for a smaller one. The output of the expandor is connected to an amplifier whose output is connected to the second transducer. However, the position of the expandor and the amplifier can be interchanged. If the acoustical impedances of the transducers and the modulator material are not matched, the modulator will become an acoustical resonator having several resonant frequencies within the bandwidth of the transducers. When these resonances are excited they occur with random phase relationships which vary with time. However, the more of these resonances that are in phase with each other, the larger the output signal at the transducer which is connected to the expandor. Since the expandor is amplitude sensitive, the larger signals are more readily fed to the amplifier and then to the second transducer. In this manner the acoustical resonances of the modulator are phase locked. This phase locking in itself produces acoustical pulses which travel back and forth in the modulator.

When the modulator is placed in the cavity of a laser so as to intercept the light beam, it causes the light beam to be switched out of the cavity as the acoustical pulses intercept it. Since the resonances of the crystal depend in part on the construction of the transducers and the length of the crystal, it is possible to construct a modulator with a resonance equal to one of the modes of a laser. When the amplifier in the present invention is supplied with a filter so that only the resonance equal in frequency to one of the laser modes is passed, the system is used to mode lock the laser.

The foregoing and other features of the present invention will be more readily apparent from the following detailed description and drawings.

DETAILED DESCRIPTION

Figure 1A:
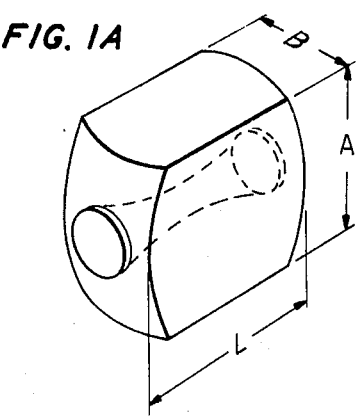
FIGS. 1A and 1B are a set of drawings of the modulator to be used in an illustrative embodiment of the invention.
Figure 1B:
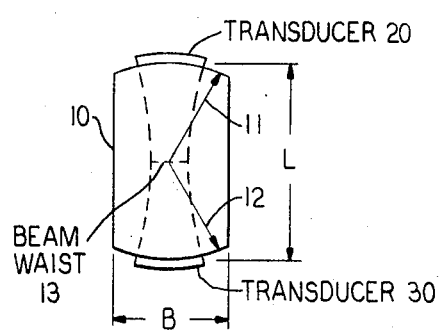

FIG. 1 shows an acousto-optic modulator of the type used in the present invention. The modulator consists of a block of any suitable acousto-optical material 10 with two opposing ends ground and polished to spherical surfaces. For example, a modulator made of quartz can be used. The radii of curvature 11 and 12 of the modulator are calculated from the well-known formula for open side optical resonators; namely $R(Z) = Z[1 + (\pi\omega_0^2/\lambda Z)^2]$ (1)

where $Z$ is the distance from the beam waist to the spherical surface, $\lambda$ is the wave length of the acoustic wave and $\omega_0$ is the radius of the acoustic beam waist 13.

This formula holds when the wave length of the acoustical beam is small compared to the cross-sectional dimension of that beam. Two electro-acoustical transducers 20 and 30 made of a suitable material are bonded or sputtered onto these spherical surfaces. For example, transducers made of X-cut crystal quartz can be used. The thickness of the transducers is made much smaller than the length of the resonator. The acoustical impedances of the transducers and the modulator material are purposely not matched, so that an acoustical resonator is formed. Also, the electro-mechanical coupling of the transducers and the propagation loss for the longitudinal waves in the modulator material are made small to obtain a high Q for the resonator.

Figure 2:
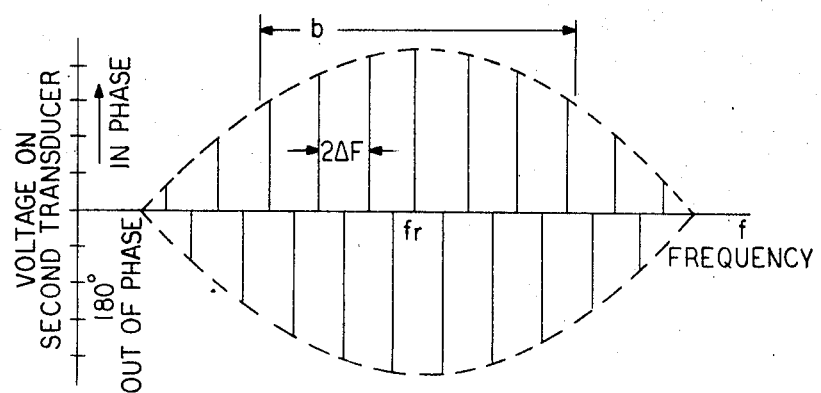
FIG. 2 is a graph of the frequency response of the modulator.

FIG. 2 is a graph of the electrical transfer function of the modulator FIG. 1. Since the length of the resonator is much longer than the acoustical wavelength, several standing wave resonances are obtained. The output voltage at transducer 30 is either in-phase of 180° out-of-phase with the input signal at transducer 20 of FIG. 1. This phase relationship depends on whether or not there are an even or odd number of acoustical wavelengths between the two transducers. The frequency spacing between resonances is $\Delta f = V/2L$ (2)

where $V$ is the acoustical velocity in the resonator material and $L$ is the length of the resonator. This equation assumes that the velocity dispersion is negligible. The center frequency, $f_r$, and the envelope of the resonances are determined by the quality Q of the transducers and by their bonds to the modulator material. The individual resonance lines of FIG. 2 have a finite width which is inversely proportional to the Q of the resonator.

Figure 3:
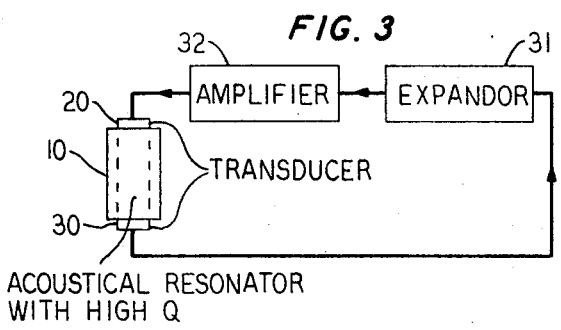
FIG. 3 is an illustrative embodiment of the invention.

The schematic of FIG. 3 is an illustrative embodiment of the present invention. The output of transducer 30 is connected to the input of expandor circuit 31 and the output of expandor 31 is connected through amplifier 32 to transducer 20. This arrangement creates a self-pulsing generator of acoustical pulses similar to the regenerative pulse generator disclosed in an article entitled "The Regenerative Pulse Generator" by C. C. Cutler in the *Proceedings of the I.R.E.*, Vol. 43, (Feb., 1955). However, in this case the resonator represents both the filter and the delay mentioned in the article. The expandor mentioned in the article and used in the invention is a circuit which provides either more gain or less attenuation for larger amplitude signals than for smaller ones.

Figure 4:
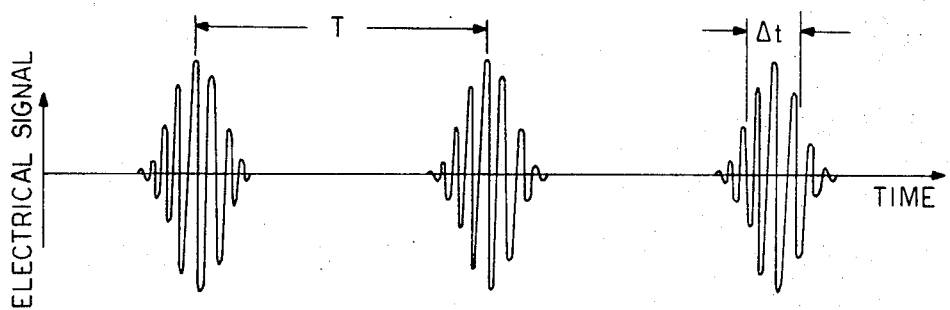
FIG. 4 is a graph of the electrical signal at the output of the amplifier in FIG. 3.

When the resonance frequencies of the modulator are excited, they occur in a random fashion. This causes a fluctuating output at transducer 30. The more of these resonance frequencies that are in-phase with each other, the larger the output. However, since the expandor is amplitude sensitive, it more readily passes the larger amplitude signals. These larger amplitude signals are amplified and used to drive transducer 20. This operation tends to force the resonances to phase lock. This phase locking causes the electrical signals to appear as shown in FIG. 4. When the electronic delay is negligible, the electrical signal is periodic with $T = 1/2\Delta f = L/V$ (3)

where $\Delta f$ is the spacing between resonances, $L$ is the modulator length, and $V$ is the acoustical velocity in the material of the modulator. In this condition only the in-phase or the out-of-phase set of frequencies of FIG. 2 can oscillate, depending on the polarity of the interconnection. However, when both transducers were mounted on one end of the modulator and the other end is highly reflecting, both sets of resonance frequencies are locked in phase. With this arrangement the electrical signal is the same at FIG. 4 except that the period is $T\text{-}1 = 2L/V$. (4)

Figure 5A:
FIGS. 5A and 5B are a set of drawings of a modulator having transducers made from one electrode.
Figure 5B:
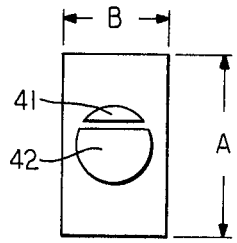

This arrangement is achieved by making the two transducers out of one unevenly divided electrode, as shown in FIG. 5. The larger portion of the electrode 42 is used as the driving transducer and the smaller portion 41 as the receiving transducer. These transducers are coupled mechanically through the modulator and their stray capacitance is made negligible. The duration of the pulses $\Delta T$, in both cases, is approximately equal to the inverse of the bandwidth $b$ of the transducers of FIG. 2.

The case where only one set of frequencies is phase locked is equivalent to having two acoustical pulses circulating in opposite directions inside the modulator. They cross the center of the modulator at the same time, producing an acoustic pulse of twice the amplitude of the individual pulses. In the case where both sets of frequencies are phase locked, only one acoustical pulse circulates inside the modulator.

The acousto-optic system of the present invention is used as an optical modulator or as a switch for optical beams, where a constant repetition rate and a constant carrier frequency are tolerable. It is used in the same manner as the nonresonant modulators of the prior art; however, there is a savings in drive power and no oscillator is needed since the amplifier expandor combination acts as an oscillator with the modulator as the feedback path.

Figure 6:
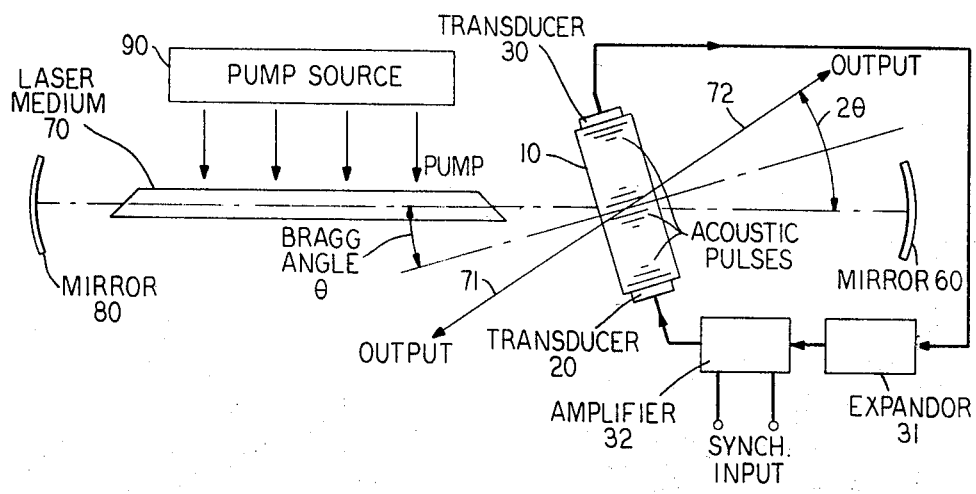
FIG. 6 is an illustrative embodiment of the invention used as a switch.

FIG. 6 shows the use of the present invention as a switch. The modulator 10 is placed inside the cavity of a laser and is oriented at the Bragg angle $\theta$ with respect to the optical beam. When the acoustic pulse is not intersecting the light beam, the light waves from the laser medium 70 are reflected from mirror 60 back into the laser medium. The laser medium is excited by pump source 90 which can be any standard pump source for the medium selected. On leaving the other end of the laser medium the light waves strike mirror 80 and are again reflected back into the laser medium. The time that it takes for a light wave to go back and forth between the two mirrors is known as the round-trip time of the laser. When the acoustic pulse intersects the light beam, two deflected beams 71 and 72 are obtained at twice the Bragg angle. These beams correspond to the two traveling waves in the laser cavity. It is possible to combine these beams with the help of a three-mirror folded laser cavity, if desired. Naturally, the maximum rate at which the light can be switch out of the cavity depends on the recovery time of the laser used.

If the light beam and the acoustical beam interact at the center of the modulator, there are two deflections for each round-trip of the acoustical pulse in the modulator. Since the light beam and the acoustical beam interact at the Bragg angle the deflected beam will always be in the same direction, independent of the direction of travel of the acoustical beam. Therefore, the length of the modulator has to be $L = V/f_r$ (5) where $f_r$ is the desired repetition frequency for deflection and $V$ is the acoustic velocity in the modulator. The pulse duration of the acoustical pulses $\Delta T$ of FIG. 4 will be in the order of the round-trip time of the laser.

Figure 7:
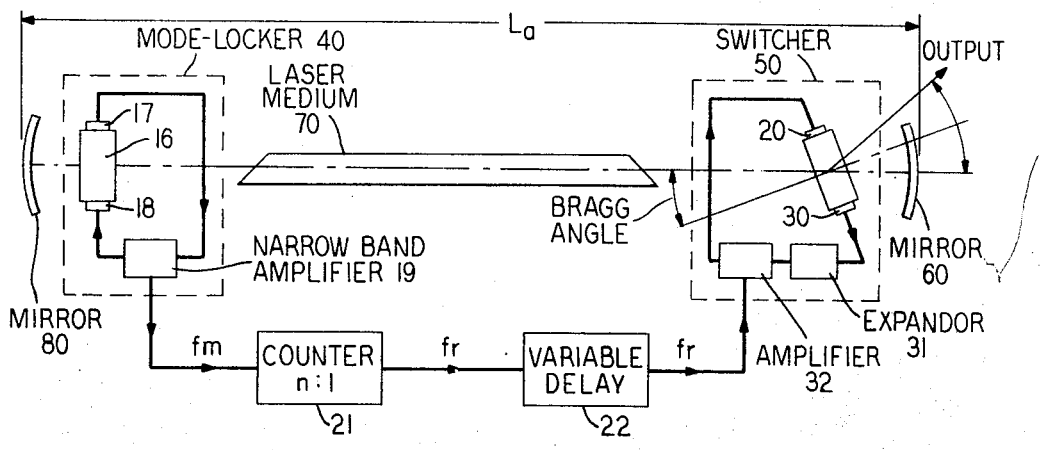
FIG. 7 is an illustrative embodiment of the invention used to mode lock and switch a laser output.

When an amplifier with a narrow passband, selective enough to excite only one of the resonance frequencies, is connected between the two transducers, a sinusoidal acoustical standing wave is generated in the modulator. A system such as this is very useful for mode locking of lasers. This arrangement, together with the arrangement of FIG. 6, can be used to simultaneously mode lock and switch a laser. FIG. 7 shows the interconnections required to perform this operation. Mode-locking system 40 and switching system 50 are placed in the laser cavity on opposite ends of the laser medium 70. The light waves generated in the laser medium pass back and forth between mirrors 60 and 80. Before the light strikes mirror 80 it passes through acousto-optical modulator 16. This modulator's length is adjusted so that one of its resonant frequencies matches one of the laser's modes. Connected between the driving transducer 18 and the receiving transducer 17 of modulator 16 is a narrow band amplifier 19. This amplifier has a center frequency at the fundamental mode of the laser; namely, $f_m = C/4L_a$ (6)
where $L_a$ is the length of the laser cavity and C is the velocity of light. The sinusoidal acoustical standing wave generated by this arrangement causes the light beam to be modulated at the fundamental mode of the laser. This causes all the modes of the laser to phase lock, causing its output to be a continuous series of short light pulses.

The output of amplifier 19 is also connected to a counter 21 which divides the frequency of the mode-locking system down to the repetition rate desired for the beam switching system. The output of the counter is connected through a variable delay 22 to the synchronization inputs of amplifier 32 of the beam switching system 50. The variable delay is added to adjust the phase relationship between the light pulses created by mode locking the laser and the acoustic pulses of the switcher. The switcher is simply the circuit of FIG. 6 with the receiving transducer 30 connected to expandor 31. The output of the expandor is connected through the wide band synchronized amplifier 32 to driving transducer 20. The modulator is oriented at the Bragg angle with respect to the light beam. When the acoustic pulse intersects the light pulses there is only one output beam consisting of a train of short optical pulses. This occurs because a mode-locked laser has only one pulse traveling back and forth in it. This pulse is removed from the cavity when the switch is activated. Then the laser medium is allowed to build up again under the influence of the mode locker. Therefore, when the switch is activated again the light pulse always enters the modulator from the same direction because of the synchronization between the mode locker and the switcher. This is different from the situation shown in FIG. 6 where there are light waves approaching from both directions when the switch is activated. The duration of the short light pulses is determined by the spectral width of the laser medium.

Figure 8:
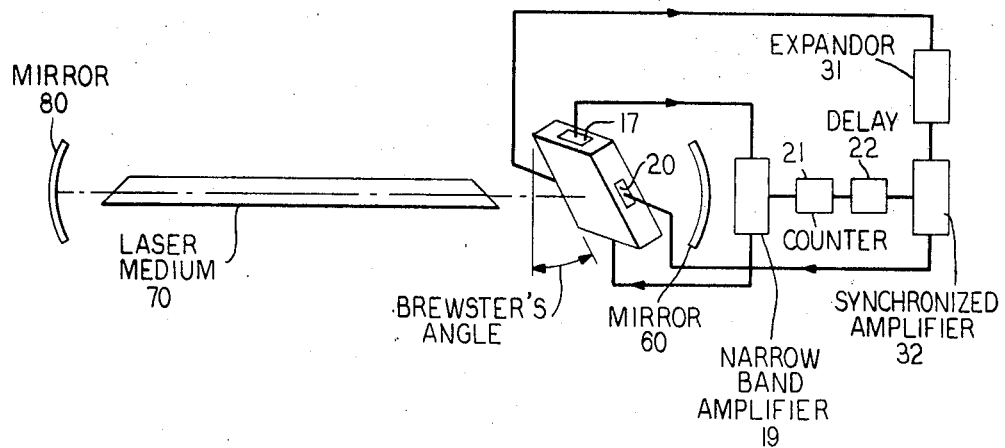
FIG. 8 is an illustrative embodiment of the invention used to mode lock and switch a laser output with a single crystal.

With this arrangement all of the internal power of the laser is extracted from the cavity. It should be noted that the mode locker and the switcher do not have to be separated by the laser medium. Their relative position only determines the phase between the mode-locking acoustical beam and the switching pulse. Therefore, reduction of optical loss in the laser cavity is achieved by combining both operations in one block of acousto-optical material as shown in FIG. 8. The two acoustical beams resonate along two orthogonal axes of the block and the optical beam propagates at Bragg's angle with respect to the third axis. To reduce the optical losses due to reflection, the optical beam is also oriented at Brewster's angle with respect to one of the first two axes.

Figure 9:
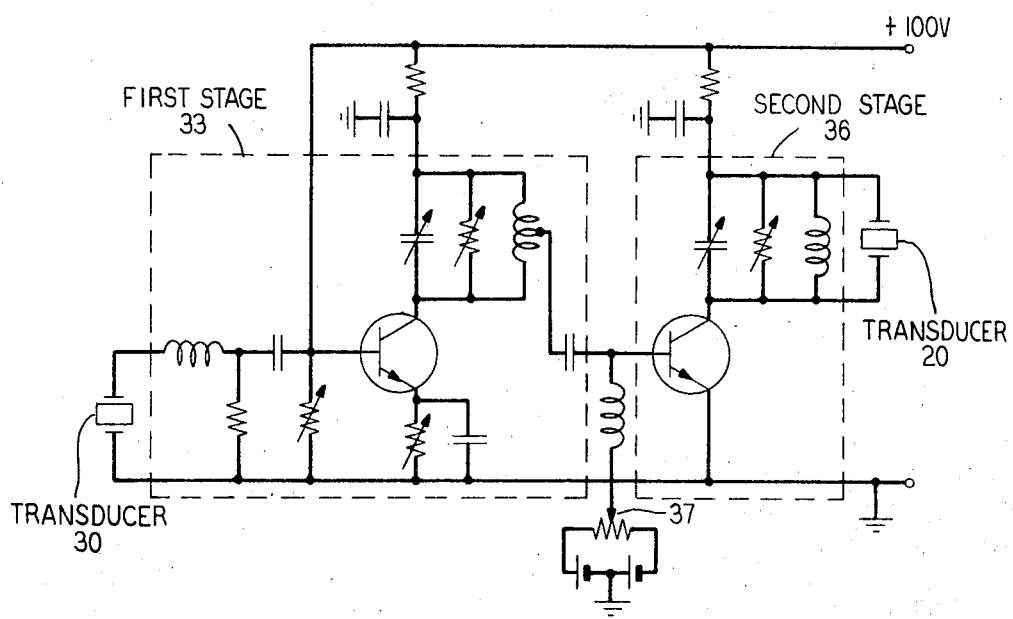
FIG. 9 is a schematic of the expandor and amplifier used in an illustrative embodiment of the invention.

FIG. 9 is a schematic of a circuit which can be used as an expandor and amplifier. This circuit could be any of the circuits well known in the art for this purpose. The first stage 33 is a class A preamplifier and the second stage 36 can be changed from class A to class C by varying the setting of potentiometer 37. The stages should be carefully shielded to prevent any other feedback than through the acoustical resonator. With the second stage operating in class A the system oscillates at a single frequency only and is used as a mode locker. This frequency is the largest amplitude resonant frequency of the modulator because the circuit becomes an oscillator with the crystal as the feedback path. When the bias is changed so that the second stage operates as a class C amplifier more resonance modes start to oscillate and acoustical pulses form in the crystal. This occurs because of the nonlinearity of class C operation. This nonlinearity also acts to perform the expandor operation.

While the invention has been particularly shown and described with reference to preferred embodiments thereof, it will be understood by those skilled in the art that various changes in form and details may be made therein without departing from the spirit and scope of the invention.

I claim:

1. A self-resonant acousto-optical modulator system comprising:
   a first member of acousto-optical material having first and second opposed surfaces,
   a driving transducer on one of said surfaces,
   a receiving transducer on one of said surfaces,
   and an amplifying means having an input, and an output, said amplifying means being characterized by having a higher gain for larger amplitude signals than for smaller amplitude signals, and having its input connected to said receiving transducer and its output connected to said driving transducer.

2. A system as claimed in claim 1 wherein said first member of acousto-optical material is made of quartz.

3. A system as claimed in claim 1 wherein the first and second surfaces of said first member of acousto-optical material are spherically-shaped surfaces.

4. A system as claimed in claim 1 wherein said driving transducer is attached to a first one of said surfaces of said first member of acousto-optical material and said receiving transducer is attached to the other one of said surfaces of said first member of acousto-optical material.

5. A system as claimed in claim 1 wherein said driving and receiving transducers comprise a single electrode attached to one of the said surfaces of said first member of acousto-optical material and which is divided into two portions, the first portion comprising the driving transducer and the second portion comprising the receiving transducer.

6. A system as claimed in claim 1 wherein said driving and receiving transducers are made of X-cut crystal quartz.

7. A system as claimed in claim 1 wherein said amplifying means comprises:
   a first-stage Class A preamplifier with its input connected to the input of said amplifying means,
   a second-state amplifier with its input connected to the output of said Class A preamplifier and its output connected to the output of said amplifying means,
   and a biasing means connected to said second-stage amplifier which biases said second-stage amplifier.

8. A system as claimed in claim 7 wherein said biasing means biases said second-stage amplifier to Class C operation, thereby creating a system capable of switching laser output.

9. A system as claimed in claim 8 wherein said biasing means biases said second-stage amplifier to Class A operation, thereby creating a system capable of mode locking a laser.

10. A self-switching laser system comprising:
    an optical cavity resonator having two reflecting members located at opposite ends of said resonator,
    an active medium located in said resonator,
    means for exciting said active medium,
    a first acousto-optic modulator with two opposed surfaces located between said active medium and one of said reflection members and oriented at the Bragg angle with respect to the axis of said resonator,
    a first driving transducer on one of said surfaces of said first acousto-optic modulator,
    a first receiving transducer on one of said surfaces of said first acousto-optic modulator, and an amplifying means characterized by having a higher gain for larger amplitude signals than for smaller amplitude signals, and having its input connected to said first receiving transducer and its output connected to said first driving transducer, thereby generating acoustic pulses in said first modulator which switch light waves away from said resonator whenever said pulses intercept said light waves.

11. A system as claimed in claim 10 further including a synchronizing input on said amplifying means which controls the operation of said amplifying means, a second acousto-optic modulator with two opposed surfaces located between said active medium and one of said reflection members and oriented at the Bragg angle with respect to the axis of said resonator, a second driving transducer on one of said surfaces of said second acousto-optic modulator, a second receiving transducer on of said surfaces of said second acousto-optic modulator, an amplifier with its input connected to said second receiving transducer and its output connected to said second driving transducer, a frequency dividing means with its input connected to the output of said narrow band amplifier, and a variable delay means with its input connected to the output of said frequency dividing means and its output connected to the synchronizing input of said amplifying means, thereby creating a single frequency acoustic wave in said second modulator which mode locks said laser switching system.

12. A system as claimed in claim 11 wherein said first and second acousto-optical modulators are part of a single member of acousto-optical material.

* * * * *